United States Patent [19]
Davis et al.

[11] Patent Number: 5,323,313
[45] Date of Patent: Jun. 21, 1994

[54] DESIGN AND IMPLEMENTATION OF DRAFTING POSSIBLE PERMUTATIONS OF A SET OF TEXT

[75] Inventors: Dan Davis, Pacific Grove; Metin Ozisik, Salinas; Stephen Bowles, Santa Barbara; Eric Little, Palo Alto, all of Calif.

[73] Assignee: Analytic Legal Programs, Palo Alto, Calif.

[21] Appl. No.: 691,553

[22] Filed: Apr. 25, 1991

[51] Int. Cl.⁵ .............................................. G06F 15/40
[52] U.S. Cl. .......................... 364/419.17; 364/419.1; 364/419.14; 364/419.19
[58] Field of Search ................ 364/419, 419.1, 419.14, 364/419.17, 419.19

[56] References Cited
PUBLICATIONS

*WorkTool Reference Manual*, The WorkForm System "Immediate Access to Collective Expertise", Copyright 1990, Analytic Legal Programs, Inc.
*WorkForm-A Ten Minutes Tour*, Analytic Legal Programs, Inc.
WorkTool Quick Reference (#1), Version 2.95, Copyright 1990, Analytic Legal Programs, Inc.
Document Assembly and Practice Systems Report, Winter 1991, vol. 3, No. 2, pp. 2-23.

*Primary Examiner*—Roy N. Envall, Jr.
*Assistant Examiner*—Gita Shingala
*Attorney, Agent, or Firm*—Steven F. Caserza

[57] ABSTRACT

This invention is a novel document preparation system in which a user is capable of viewing various permutations of a predefined portion of text. With this invention the display of variations in text is performed automatically. This provides a technique by which the developer can more quickly audit the results of his work and on the user's side it permits the user to rapidly see a wide variety of different transactions which is of enormous use to a young associate learning a particular practice area. In one embodiment, the user is provided with a subset of the total number of permutations of a particular portion of text. Various techniques are used to provide only "meaningful" variations of the text, thereby avoiding the need for the user to view what might be an extremely large number of permutations, many of which are of no real import based upon the task at hand.

13 Claims, No Drawings

DESIGN AND IMPLEMENTATION OF DRAFTING POSSIBLE PERMUTATIONS OF A SET OF TEXT

INTRODUCTION

This invention pertains to document generation systems (expert systems containing text processors)—particularly expert systems which are capable of drafting variations of text based upon answers to various questions.

A wide variety of document generation systems and text processors are known in the prior art, including the relatively common word processor. A more sophisticated and special purpose system is the WorkForm TM System available from Analytic Legal Programs, Inc., the assignee of this invention.

In one module of the WorkForm System text can be created and stored. Portions of such text (words, clauses, phrases, sentences, paragraphs, etc.) can be linked to one or more questions. When the drafting module of the WorkForm System is invoked, such linked portions of text are included in the document to be produced, depending upon the answers to the questions.

The questions can, if desired, specify that the required answer is a Boolean statement (ie. yes/no or true/false), a number, a date, one or more than one of several predefined selections, or that the answer meet various other conditions. The questions are stored seperately, as is the logic controlling the conditions under which questions are asked. The text, questions and logic are specified by a knowledgeable user, for example an attorney creating a master form document.

Once the "WorkForm application" has been created, a user preparing a specific form for a particular purpose is guided through the questions by the WorkForm System. In response to each question, the user provides an appropriate answer. The WorkForm System then drafts a document which has been tailored specifically to the purpose at hand in an effective and efficient manner since the WorkForm System is guiding the user through the form based upon the predefined questions.

Depending upon how the questions are answered, the resulting document may have different text. Under prior art, to see the different documents (or portions thereof) that might be drafted as a result of different answers to questions, the user must identify the relevent questions, change the answers one at a time, and draft the resulting documents. The difficulty of doing this increases nearly expotentially with the number of questions involved. This invention calculates the number of different documents ("permutations") (or portions thereof) automatically, and then drafts them one at a time.

A more detailed description of the WorkForm System is described in "WorkForms a Ten-Minute Tour", Copyright 1990 by Analytic and "The WorkTool Reference Manual" Rev 2.95 Copyright 1989, 1990 by Analytic Legal Programs, Inc., the assignee of this application.

SUMMARY

This invention is a novel document preparation system in which a user is capable of viewing various permutations of a predefined portion of text.

A desirable feature of document generation systems would be the capability of displaying variations in text both to the developer and to the user. At present in Workform and in other prior art systems this must be done by the user answering questions one at a time. In the prior art, this must be done by the user changing the answers to questions one at a time and for each change drafting the document and comparing the results. With this invention this process is performed automatically. This provides a technique by which the developer can more quickly audit the results of his work and on the user's side it permits the user to rapidly see a wide variety of different transactions which is of enormous use to a young associate learning a particular practice area.

In one embodiment of this invention, novel means are used to provide the user with a subset of the total number of permutations of a particular portion of text. Various techniques are used to provide only "meaningful" variations of the text, thereby avoiding the need for the user to view what might be an extremely large number of permutations, many of which are of no real import based upon the task at hand.

DETAILED DESCRIPTION

A goal of this invention is to create and present to the user through a user interface (such as a CRT, for example) all or a selected subset of all possible representations of a Paragraph based upon the various answers which might be given to the predefined questions.

TABLE OF CONTENTS

1. Definitions

2. Design 2.1. Complete Paragraph
2.2. Block Tree
2.3. Evaluations of Block Nodes
2.4. Modifier Questions
2.5. Tree State
2.6. Question List State
2.7. Relation Between qlist State and Tree State
2.8. State Table
2.9. Building the Block Tree
2.10. Building the Question List
2.11. Building the Master State Table
2.12. Question List Iteration
2.13. Drafting Implementation 3.1. Primatives
3.1.1 Bit Strings
3.1.2 Stacks
3.1.3 Linked Lists
3.2. Process Specific Structures
3.2.1 Sequences
3.2.2 Mtrees (Multiple Children Trees)
3.2.3 Bktree (Block Tree)
3.2.4 Qlists (Question Lists)
3.2.5 State Table
3.3. Run Time Picture
3.4. Uses of Permutations 4. Certain Alternative Embodiments 4.1. The Present Embodiment
4.2. Selection of "Relevent" Variations
4.3. User Selected Questions

1. Definitions

As used in this specification

"blocks" refers to blocks of text within the template, each block being linked to a particular question or rule (a combination of questions).

"child" or "children" refers to one or more blocks which are contained within a parent block.

"Paragraph" means a subset of the text in the Template which may, correspond to one or actual paragraphs of the Template or any particular draft document.

"parent" means a block containing one or more child blocks.

"Template" refers to the database of text used by the expert system to draft documents. Such text may contain within it a block structure linking portions of text to answers to particular questions (as in the WorkForm System), or such links may be stored seperately (with a list of pointers to the alternative text), thereby allowing the template to be expressed as a block structure.

2. Design

The following are the primitives which are used in designing the process.

2.1. Complete Paragraph

A first step is to locate a complete Paragraph which does not include any incomplete blocks. Suppose the user specifies two points p1 and p2 in the following Template text (which may be accomplished utilizing predefined function keys on a keyboard with or without associated cursor movements, for example):

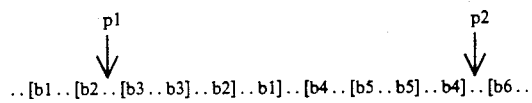

In the above representation "b" refers to "block", with "[b1" indicating the beginning of block b1, and "b1]" indicating the end of block b1. As shown in the above depiction, blocks can be nested as desired. Since blocks b2 and b1 are incomplete in the p1-p2 interval as specified by the user, p1 is relocated to provide a complete Paragraph as shown:

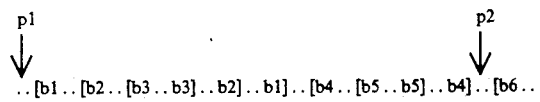

As another example, if initially p1-p2 interval is specified as:

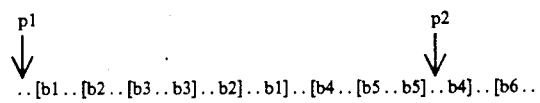

then p2 is relocated as:

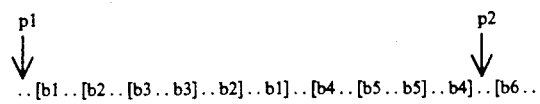

Thus, as shown in these examples, the first step is to obtain an interval as specified by a user. This interval is then adjusted outward in order to ensure that it represents a "complete Paragraph" which does not include any incomplete blocks.

2.2. Block Tree

Once a complete Paragraph is specified, a block tree is created, under a dummy root. Given the following p1-p2 interval

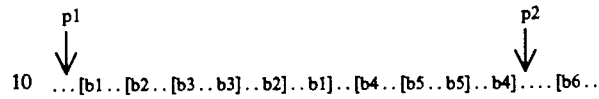

the block tree for the above Paragraph looks like:

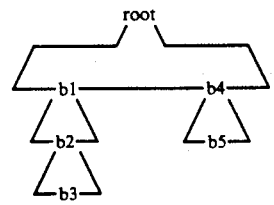

Note that the number of the children of a block tree node is not limited. So in the above structure, b2 could have had more than one child, as in this example:

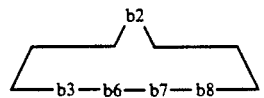

In the embodiments described in this Application, when the block tree is created, block nodes are numbered in creation order. So, the preorder traverse of a block tree visits block nodes in increasing numbered order.

2.3. Evaluations of Block Nodes

Each block represents a decision to include or not include alternative text in the draft document. Thus, each block represents a decision point. While different documents result from inserting variable information within a document—similar to filling in blanks—these variations are ignored in this embodiment as immaterial.

Each block node is associated with a conditional expression which determines if the referred block should be included in the draft or not. These conditional expressions may be variously phrased. In the present embodiment, they are either required answers to questions, or some logical combination of required answers (using the Boolean operators "or", "and" and "not").

These conditional expressions are evaluated at permutations compile-time, which is the compilation of a state table based upon the block tree.

2.4. Modifier Questions

Only questions (and their associated answers) that affect the state of a given block tree are of interest in this invention. These questions are called modifier questions. These questions are identified while the block tree is built, and they comprise a question-list.

In any given WorkForm application the question list for a specified Paragraph does not duplicate any question, although a single question might have applicability at more than one more location within a Paragraph. As an example, for the following complete Paragraph:

..[Q1=Yes...Q1=Yes]...[Q1=Yes...Q1=Yes]...[Q2=Yes...Q2=Yes]...

a corresponding block tree and a question list are created as:

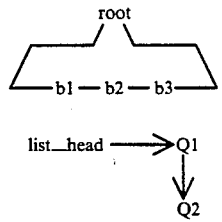

2.5. Tree State

A block tree state is kept as a string of bits. Every block node is represented by a single bit, which is "1" if the block will be drafted, "0" otherwise. The length of a "tree state" is the number of the nodes in the block tree. If the length of a bit string is not any multiple of byte size, it is aligned to a multiple of byte size and the extra bits are not used. The first bit of a tree state represents the first node (in preorder traverse) of a block tree, the second bit represents the second node, and so on.

Given the following complete Paragraph and its block tree:

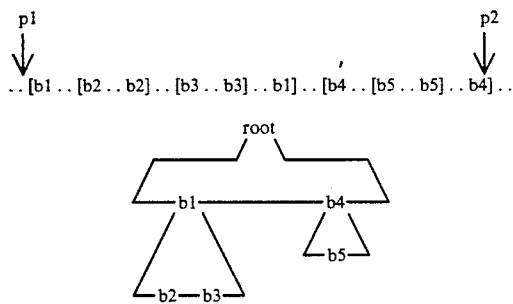

a tree state "10110" means:
block b1 will be drafted,
skip over b2,
block b3 will be drafted,
block b4 will be drafted, and
skip over block b5.

There are certain tree states which cannot be possible. For example, there cannot be a tree state "01000" for the above case, because block b2 cannot be drafted when its parent block b1 will not be drafted.

2.6. Question List State

We have seen that every block tree is associated with a question list. Similarly, every block tree state will be associated with a question list state, or "qlist state," which is to say that every drafted document is associated with a set of answers. The question logic need not be a function of the Paragraph being analyzed, but may exist independently of the Paragraph being analyzed.

A qlist state is a string of bits similar to the string of bits which forms a tree state. The bits of the qlist state correspond to the states of the questions (answers) in the associated question list. To illustrate the concept, suppose we have a question list with the questions in order: Q1, Q2, and Q3.

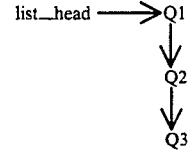

Q1 is a Yes/No question, and Q2 and Q3 are multiple choice questions. Q2 has three choices, and Q3 has five. We need only one single bit to represent the Q1 state. Q2 needs two bits and Q3 needs three bits to be properly defined.

A qlist state 11011 means:

Q1==1,    i.e. Q2==Yes
Q2==10,   i.e. Q2==3
Q3==011,  i.e. Q3==4.

(the first choice number is 1, rather than 0).

Note that, for example, a qlist state 110111 for the above list is invalid, since per the definition of this example Q3 cannot have a value greater than five.

2.7. Relation Between qlist State and Tree State

A block tree state might be the result of multiple qlist states. More than one qlist state may generate the same tree state. But a qlist state for a given block tree can produce only one unique tree state. So, the relation between qlist and tree states is a many-to-one relation i.e. many different sets of answers might produce the same document text.

2.8. State Table

In order to draft the various permutations of text for a given Paragraph, it is desirable to generate unique, possible tree states. The tree list is processed to derive each possible tree state. Every time a "different" tree state is generated, that state and its driver qlist state are added into a state table. Other possible qlist states which can drive the same tree state are ignored when they are encountered as the tree list is evaluated.

The state table is thus stored with "tree state"—"qlist state" pairs such that redundancy among tree states are avoided.

As an example, the following complete Paragraph:

..[Q1=Yes..[Q2=Yes...Q2=Yes]..[Q3=Yes..Q3=Yes]..Q1=Yes]..

generates the following block tree and question list:

block tree: 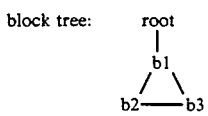   question list: 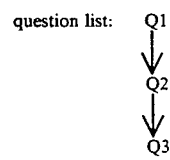

The following set of all possible qlist states for this example generates the corresponding tree states:

| glist state | tree state |
|---|---|
| 000 | 000 |
| 001 | 000 |
| 010 | 000 |
| 011 | 000 |
| 100 | 100 |
| 101 | 101 |
| 110 | 110 |
| 111 | 111 |

Since we desire "unique" tree states, the information stored into a state table after processing the above block tree and question list is:

| tree state | glist state |
|---|---|
| 000 | 000 |
| 100 | 100 |
| 101 | 101 |
| 110 | 110 |
| 111 | 111 |

Thus, in this example, there are only five different possible representations of the complete Paragraph based upon different answers to the embedded questions, and the qlist states in the above state table can generate them.

The number of the blocks in a complete Paragraph is not directly related to the number of different permutations of the paragraph text. Suppose, for example, a Paragraph has a flat block tree with five blocks on it, as now shown:

[Q1..Q1]..[Q2..Q2]..[Q3..Q3]..[Q4..Q4]..[Q5..Q5]..

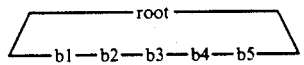

and suppose all those questions have two possible answers, as do Yes/No questions. In this example, there are 32 permutations of the Paragraph depending on the answers to the five questions Q1-Q5.

As an example in which the block tree is not as flat as the previous example:

[Q1..[Q2..Q2]..[Q3..Q3]..[Q4..Q4]..Q1]..[Q5..Q5]..

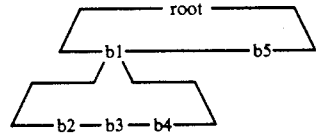

and questions Q1-Q5 have two possible answers, then 18 different permutations result:

| b1 | b2-b4 | b5 |
|---|---|---|
| 0 | n/a | 0 |
| 0 | n/a | 1 |
| 1 | 8 possibilities | 0 |
| 1 | 8 possibilities | 1 |

As an example of a vertical block tree:

[Q1..[Q2..[Q3..[Q4..[Q5..Q5]..Q4]..Q3]..Q2]..Q1]..

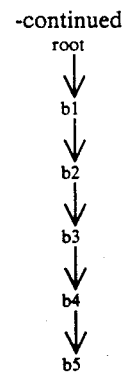

there are 6 different permutations only, with tree states: 11111, 11110, 11100, 11000, 10000, 00000.

The shape of the block tree, by itself, is insufficient to determine the number of permutations. Consider the block tree examined previously which resulted in 18 different permutations:

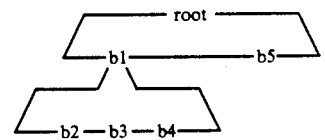

If this same block tree has a different question list:

[Q1..[Q1..Q1]..[Q1..Q1]..[Q1..Q1]..Q1]..[Q1..Q1]..

The result is only two different permutations only (rather than 18), with the tree states 00000 and 11111.

2.9. Building the Block Tree

A block tree node has the following member data (expressed in "C" notation):

```
class bknode {
    long place;       // beginning of the block in
                      //   Template file this can be a
                      //   pointer to the Template in
                      //   the memory too.
    int qno;          // question number
    char flag;        // nature of operation (i.e.
                      //   inclusion or exclusion).
    char status;      // skip this for now.
    boolean full;     // FALSE if there is nothing in
                      //   the block.
    bknode *sibling;  // pointer to next sibling. if
                      //   status says this is the last
                      //   sibling, then this points
                      //   back to the parent.
    bknode *child;    // points the first child if
                      //   not leaf.
}
```

The following public member functions are sufficient to build the block tree: (prefix "bk" means block tree).

```
void    bk_attachchild(bknode *, bknode *);
void    bk_attachsibling(bknode *, bknode *);
bknode  *bk_getparent(bknode *);
```

The first parameter (bknode *) is always "this" pointer, e.g., to "this" node attach a child, to "this" node attach a sibling, etc.

Constructors and destructors of the object:

```
bknode  *bk_alloc( );
void    bk_free(bknode *);
void    bk_const(bknode *);
void    bk_dest(bknode *);
```

The following are needed to answer some queries:

```
boolean  bk_eval(bknode *);           // return TRUE if the
                                      block needs to be
                                      drafted.
bknode   *bk_getfirstchild(bknode *);
boolean  bk_isleaf(bknode *);
boolean  bk_islastchild(bknode *);
The following is used when building the question list:
void     bk_addques(bknode *, qlist *);  // add questions of a
                                         given block to a
                                         given question
                                         list.
```

This is the routine to build the block tree. Given two points (to the beginning and end of a complete Paragraph), it will build and return the block tree.

```
bknode* bk_build(char *pBegin, char *pEnd, qlnode
   **ques_list);
```

2.10. Building the Question List

The question list is built by the bk_build () routine simultaneously when building the block tree. To do that, an empty qlist is created and passed to bk_build(). bk_build() attaches the questions to the list, and then evaluates the blocks in the Paragraph to build the block tree.

```
class qlnode {
    int      qno;            // question-list node
    int      nch;            // question number
    char     state;          // number of choices
    long     saved_state;    // choice number
                             // question's state
                             from the user's point
    qlnode   *next;
}
typedef void    (* QL_MAPFN)(qnnode *, void *);
qlnode   *ql_alloc(int);       // param. is the quest.
                               number
void     ql_free(qlnode *);
void     ql_const(qlnode *, int);
void     ql_dest(qlnode *);
void     ql_setnext(qlnode *, qlnode *);
void     ql_map(QL_MAPFN, void *);
void     ql_initchoice(qlnode *);   // set to initial choice
                                    state
boolean  ql_nexchoice(qlnode *);    // set to next choice
boolean  ql_islast(qlnode *);       // TRUE if the last
                                    question will be
                                    explained in detail.
void     ql_iterate(qlnode *, void *);
class qlist {                       // question list
    qlnode *head;
}
typedef void    (* QL_MAPFN)(qlnode *, void *);
qlist    *ql_alloc( );
void     ql_free(qlist *);
void     ql_const(qlist *, int);
void     ql_dest(qlist *);
void     ql_map(qlist *, QL_MAPFN, void *);
```

One example of the bk_build function is as follows:

```
static fmeaning meaning(c)
char    c;
    switch ( c )  {
    case 'b' :
    case 'x' :      return (B_ENTRY);
    case 'e' :
    case 'y' :      return (B_EXIT);
    case 'k' :      return (B_SUBST);
    default:        return (B_UNKNOWN);
    }
Given two pointers to the beginning and end of a paragraph,
build the block tree:
bknode    *bk_build(head, blk_ques)
qlnode    **head;                      /* question list head */
sequence  *blk_ques;
    bknode    *root, *parent, *curr;
    qlnode    *qlhead;                 /* ques. link list head */
    struct    stack  *st;
    char      cc;
    int       qno;
    fmeaning  kind;
    Sequence  *sq;
    int  cnt = 0;
    int  qtyp;
    blk_cnt = 0;
    st = st_alloc( );                  /* allocate a stack */
    curr = root = bk_alloc( );         /* alloc a dummy root */
    qlhead = NULL;
    bk_setqno(root, -1);
    bk_setfull(root, 1);
    st_push(st, (char *)root);         /* push to the stack */
    while ( cc = sGetch( ) )  {
        if ( cc == '!' )  {
            long mark = sMark( );
            cc = sGetch( );
            qno = get_Sqno( );         /* get a question from
                                        stream */
            if ( !qno )  {
                sSeek(mark);
                cc = '!';
                goto not_command;
            }
            qno = qu_intern(qno);
        if (ques_process(qno))
            switch ( kind = meaning(cc) )  {
            case B_ENTRY :
                                       /* add the new block
                                        into the */
                                       /* block tree . . . */
#ifdef PROCESS_KFLAG
            case B_SUBST :   /* or just add it as a child */
#endif
                parent = (bknode *)st_top(st);
                ASSERT (parent);
                curr = bk_alloc( );
                bk setqno(curr.     )
                    *(int*)sq_elem(blk_ques, blk_cnt++) = qno;
                DEBUGSTR(  fprintf(_stderr, "%d±n", qno);    )
                bk_setflag(curr, cc);
                bk_attachlastchild(parent, curr);
#ifdef PROCESS_KFLAG
                if ( kind == B_ENTRY)
#endif
                    st_push(st.(char *)curr);
question list  */                      /* put into
                if ( qtyp == QTtextasng )  {
                    Sequence *sq;
                    int cnt = 0;
                    sq = sq_alloc(sizeof(int), 5);
                    qu_closeprereq(qno, sq, & cnt);
                    while ( cnt -= )
                        qlhead = ql_addQ(qlhead, *(int*)sq_elem(sq,
cnt));
                }
                else
                    qlhead = ql_addQ(qlhead, qno);
                break;
            case B_EXIT :
                if (st_top(st) == (char*)root )   /* in case of non-
                                                   complete */
                    continue;                      /* paragraph */
```

-continued

```
        curr = (bknode *)st_pop(st);
        ASSERT(curr);
        break;
    default :
        break;
        if   ( sNext( ) == '<' ) {
            if (!sGetch( ))        /* consume it! */
                goto end_while;
        if   ( kind == B_ENTRY 11 KIND == B_SUBST)
            while   ( (cc = sGetch( )) != '>' ) {
                if   ( !cc )
                    goto end while;
                if   ( isdigit(cc))
                    curr->choices 1= (unsigned long)(1L << (cc
- '1'));
            }
            else
                while   ( (cc = sGetch( ))   !='>'){
                    if   ( !cc )
                        goto end_while:
                }
        }
        else {
not_command;
                            /* if a printable character, mark the
current */
                            /* block as full.
*/
            if   ( !bk_isfull(curr) && isprint(cc) &&
!isspace(cc))
                bk_setfull(curr, 1);
        }
    }
end_while;
    *head = qlhead;
    st_free(st);
    return (root);
```

2.11. Building the Master State Table

The Master State Table is a dynamic array structure, with elements of qlist-state tree-state pairs. It is the Master State Table's responsibility to keep track of the number of the elements in it. The Master State Table stores newly generated qlist-state tree-state pairs if the given tree-state is not already stored in the Master State Table.

2.12. Question List Iteration

Question list iteration works much like a mechanical calculator. Turning the iterator arm sets the right most digit to all its possible outcomes, following which the next digit on its left is invoked.

The operation of one embodiment of the Question list iterative operation is now explained given the following qlist:

First, Questions Q1-Q3 are initialized to their first choices. Suppose Q1 and Q2 are yes/no questions and Q3 is a triple choice question. Initially they are set to Q1=Yes, Q2=Yes, Q3=1 question states. Member function ql_iterate() is called for the first element with an empty qlist state, e.g.,

```
        ql_iterate(pQ1, qlist_state);
ql_iterate(qlnode *pQ, void *qlist_state)
{
    save qlist_state;
    for every choice of the qlnode do {
        set qlist_state to its first saved value;
        add qlnode state to the existing qlist_state;
        set question's answer to qlnode state;
        if qlnode has a next
            qlist_state = ql_iterate(qlnode->next,
qlist_state);
        else {                          // last member
                                        of qlist
            evaluate block tree state;
            add qlist-state tree-state pair into a state table
if not there;
        }
        return qlist_state;
    }
}
```

When ql_iterate() is iterated on the first element of question list, it completes the state table automatically. To accomplish this, ql_iterate() cells itself recursively, and its iterator loop is turned as many times as the multiplication of the number of choices of the questions in the question list. This number increases exponentially by the number of the questions in qlist. Sometimes it might be too time consuming and require large amounts of memory to do a complete iteration. Here, some heuristics might be used to force some of the questions into a "fixed" state, and its "impossible" states will not be iterated if desired.

2.13. Drafting

Iteration of the question list generates qlist states and corresponding tree states. If the newly generated tree state is not in the state table, the newly generated tree state and qlist state pair is added into the state table.

Once the state table is completed, it provides enough information about all different representations of the Paragraph and how to generate these representations. To draft a particular representation, questions in the question list are set to the values in its qlist state, and then the drafting algorithm is implemented based upon these present values of the questions.

3. IMPLEMENTATION

To accomplish the drafting of various permutations of a Paragraph, we introduce some primitive data structures, and then construct the main algorithm on these data structures.

3.1 Primitives

3.1.1 Bit Strings

Bit strings are "strings of bits" which are used for various purposes. Their length is dynamic, so they can grow and shrink in the process' memory space. The structure is not dependent on any other module or external data, and it does not produce any internal or external side effects. The object can be created dynamically as many as needed, and can be used as many times as wanted for different purposes.

The following is the window from this object to the external world:

| object type (class): bstring | | |
|---|---|---|
| bstring | *bs_alloc( ); | // creation |
| void | bs_free(bstring *); | // deletion |
| bstring | *bs_dup(bstring *); | // duplicate the object |
| | | // comparison of two class objects |
| int | bs_cmp(bstring *, bstring *); | // add new bits to the object |
| bstring | *bs_add(bstring *, int, unsigned char); | // retrieve bits from the object |
| unsigned | int bs_getbits(bstring *, int, int); | // get object length |
| int | bs_getlength(bstring *); | // set object length (shrink |
| | | // object size this way) |
| void | bs_setlength(bstring *, unsigned int); | |

The class does not inherit from any other classes. The classes used to express the question list states and block-tree states. As described further below, the state table is made of a linked-list of bit-string pairs.

3.1.2 Stacks

This primitive is also a generic, general-purpose structure with no side effects to or from other modules, and it can work on multiple instances simultaneously (no internal side-effects). It does not inherit from any other class. The following is a brief description of its public functions:

| object type: struct stack | | |
|---|---|---|
| struct | stact *st_alloc( ); | // creation |
| void | st_free(struct stack *): | // deletion |
| int | st_push(struct stack *, char *); | // push to stack |
| char | *st_pop(struct stack *); | // pop an element |
| char | *st_top(struct stack *); | // return top |
| element | | |

| void | st_clear(struct stack *); | // clear the stack |
|---|---|---|
| int | st_empty(struct stack *); | // TRUE if stack empty |

This class is used in the building process of the block tree.

Elements being pushed or popped from the stack are pointed by a (char*) type, and it can be converted into a (void*) if desired. Stack elements need to have their type casts in the code.

3.1.3 Linked Lists

| object type: llnode | | // type of one linked-list node |
|---|---|---|
| | | // map and match functions |
| typedef void | (*LLMAPFN) (llnode *, void *); | |
| typedef int | (*LLMATCHFN) (llnode *, void *); | |
| llnode | *ll_alloc( ); | // creation |
| void | ll_free(llnode *): | // deletion |
| void | ll_const(llnode *); | // constructor |
| void | ll_dest(llnode *); | // destructor |
| | | // append a node |
| void | ll_append(llnode *, llnode *); | // map a given function to |
| | | // all of the list members |
| void | ll_map(llnode *, LLMAPFN, void *); | // given a match function, return |
| | | // the first satisfying llnode |
| llnode | *ll_match(llnode *, LLMATCHFN, void *); | // merge a list to another |
| int | ll_merge(llnode *, llnode *); | // given a select function, |
| | | // return a subset linked-list with |
| | | // all its members are satisfying |
| | | // the given select function |
| llnode* | ll_subset(llnode*, LLMATCHFN, void*); | |

This structure is used in question lists and state tables. This class does not have any data cell, and users need to inherit from this class to have their custom linked-list structures.

3.2. Process Specific Structures

3.2.1 Sequences

Sequences are a sequence of elements of any type. They are implemented as a dynamic substitute to static arrays. They can be through as dynamic arrays. In an alternative embodiment, link-list structures perform the same job, but with a greater amount of overhead.

Like link lists, sequences are dynamic, but unlike link lists can provide relatively direct access to its members.

| object type: Sequence | | |
|---|---|---|
| typedef int | (*SQMAPFN) (char *, void *); | |
| Sequence | *sq_alloc(int, int); | // creation |
| void | sq_free(Sequence *); | // deletion |
| void | sq_const(Sequence *, int, int); | // constructor |
| void | sq_destr(Sequence *); | // free |
| void | *sq_elem(Sequence *, int); | // access to an element |
| | | // map a function to all elements |
| void | *sq_map(Sequence *, SQMAPFN, void *); | |

Allocator of the class needs two parameters, element size and the desired block size. Since the class is general-purpose and can work on any type of element, it needs to know the size of the element it will be dealing with.

This class is used to pass various information between some functions. For instance, a given question's prerequisites is returned in a sequence by a function. For that purpose a static array is not used because the number of the prerequisites is unknown.

Accessing to an element of the sequence is actually accessing to the address of the element for any purpose (both reading and writing).

3.2.2 Mtrees (Multiple Children Trees)

This is another general-purpose class, which is used to create the block-tree for a given Paragraph.

```
object type; bknode (block node)
bknode*    bk_alloc( );                           // creation
void       bk_free(bknode *);                     // deletion
void       bk_const(bknode *);                    // constructor
void       bk_dest(bknode *);                     // destructor
                                                  // given two pointers to the
                                                  // beginning and end of a Paragraph,
                                                  // build a block tree and a
                                                     question list.
bknode*    bk_build(char *, char*, qlnode **);    // given a block node and
                                                     publicly available
                                                  // question and answer structures,
                                                     evaluate
                                                  // the block and return TRUE if
                                                     the block
                                                  // needs to be drafted.
int        bk_eval(bknode *);                     // given a block tree, return its
                                                     tree-state
                                                  // in a bit-string.
bstring    *bk_state(bknode *, bstring *);
```

```
Object type: mtnode (mtree node)
typedef int    (*MTMAPFN) (mtnode *, void *);
mtnode     *mt_alloc( );                          // creation
void       mt_free(mtnode *);                     // deletion
void       mt_const(mtnode *);                    // constructor
void       mt_dest(mtnode *);                     // destructor
boolean    mt_isleaf(mtnode *);                   // TRUE if leaf
mtnode     *mt_getparent(mtnode *);               // return parent or NULL
boolean    mt_islastchild(mtnode *);              // is last child or sibling?
mtnode     *mt_getsibling(mtnode *);              // get next sibling or NULL
mtnode     *mt_getfirstchild(mtnode *);           // get first child
                                                  // attach a mtnode as first child
void       mt_attachfirstchild(mtnode *, mtnode *); // attach a mtnode as last child
void       mt_attachlastchild(mtnode *, mtnode *);  // attach a mtnode as next sibling
void       mt_attachsibling(mtnode *, mtnode *);    // map a function to all tree nodes
void       mt_map(mtnode *, MTMAPFN, void *);
```

This is again a stand-alone class with no side effects like the previous classes already presented. Since the class does not carry any user data, it needs to be inherited for custom usages.

3.2.3 Bktree (Block Tree)

This class is used to generate a block tree after processing a complete Paragraph. The class inherits directly from mtree, so mtree protected and public functions are directly available to the class.

This class is not an independent, self-defined structure. Evaluating a block node (bk_eval()) requires to see the question and answer structures. Since those structures are globally exposed and accessible, they are accessed either directly or through an interface (in the case of questions).

3.2.4 Qlists (Question Lists)

This is a linked list structure, inheriting from llist class. This structure is built at the same time as the block tree. After the main question list is built, another question list is generated out of the first list's prerequisite questions, if desired. Then the two lists are merged and the resulting list is used to generate the text permutations.

```
object type: qlnode (question list node)
qlnode*    ql_alloc( );                           // creation
void       ql_free(qlnode *);                     // deletion
void       ql_const(qlnode *);                    // constructor
void       ql_dest(qlnode *);                     // destructor
void       ql_setqno(qlnode *, int);              // set and get
int        ql_getqno(qlnode *);                   // question
                                                     number
void       ql_setnch(qlnode *, char);             // set and get
                                                     the
char       ql_getnch(qlnode *);                   // number of
                                                     choices
void       ql_setstate(qlnode *, char);           // set and get
char       ql_getstate(qlnode *);                 // question state
                                                  // get or set a qlnode to
                                                     user's
```

```
                                              // choice of state
void            ql_setsavedstate(qlnode *, unsigned long);
unsigned long   ql_getsavedstate(qlnode *);
qlnode*         ql_qexist(qlnode *, int);     // return the qlnode
which has
                                              // the given question
                                                 number.
qlnode*         ql_getpre(qlnode *);          // given a list of
                                                 questions, create
                                              // another list including
                                                 first list's
                                              // prerequisite questions
                                              // reset the question
                                                 answers
                                              // to their previously
                                                 saved values.
void            ql_reset_to_saved(qlnode *, void *);
                                              // the iteration machine.
                                                 This
                                              // routines tries all
                                                 possible
                                              // permutations and
                                                 creates a state
                                              // table with unique block
                                                 tree
                                              // states
bstring*        ql_iterate (qlnode *, bstring *);
```

3.2.5 State Table

The state table is made out of a linked-list of state table elements ("stelems"). Stelems inherit from llist class. In addition they keep a pair of bitstrings representing question list states and tree states.

```
typedef struct {
    llnode ll;              /* inherit from lllist
*/
    bstring *qlstate;       /* question list state
*/
    bstring *tstate;        /* tree state          */
} stelem;                   /* state table element
*/
typedef struct {
    int     elemno;         /* # of the elements   */
    stelem  *head;          /* head of elem list   */
    stelem  *tail;          /* tail of elem list   */
} sttable;                  /* state table         */
```

Stalems are hidden under an interface for the state table, and they should not be of user's interest. The following member functions are sufficient to access the state table structure.

```
sttable *stt_alloc( );        // creation
void    stt_free(sttable *);  // deletion
                              // add a new qlist-state/tree
                                 state
                              // to a state table
int     stt_add(sttable *, bstring *, bstring *);
void    stt_dump(sttable *);  // dump a state table
                              // given a state table and its
                                 associated
                              // question list, draft all tree
                                 states
void    stt_draft(sttable *, qlnode *);
```

3.3. Run Time Picture

Here, we introduce two globals: the root of the block tree, and the state table. Since the main iteration routine (ql_iterate ()) shows an exponential behavior and calls itself recursively, for efficiency we prefer not to pass those two data structures every time.

Consider a Paragraph between p1 and p2 pointers, for which we would like to calculate permutations. The block tree for this Paragraph is built by the bk_build() function as:

block_root=bk_build (p1, p2, &qlhead);

bk_build() builds the block tree and returns its root. It also creates a question list and returns its head as one of its parameters. If we want to include prerequisite questions in our permutation calculation, a prerequisite question list is obtained out of the existing question list as:

pre_list=ql_getpre (qlhead);

If pre_list is not empty, we need to filter out the type of questions we are not interested in. Yes/No and multiple choice questions are the only ones we want to include in our permutation. A subset of pre-list is obtained as:

pre_list=ll_subset((llnode *)pre_list, filter_fun, NULL);

Here, filter_fun is the filter function which returns FALSE for the data we want to filter out.

If we don't care about prerequisites, we do not need a prerequisite list. In this case we can omit the above phase, and this simplifies the following iteration phase. If prerequisites are required, then the above prerequisite list is merged into the question list. This is done by ll_merge() function which simply merges two llist objects as:

ll_merge((llnode *)qlhead, (llnode *)pre_list);

The resulting question list is initialized, and the init_qlnode () function saves the user's answers for qlist questions, and sets qlist nodes into their first possible states. This is choice number 1 for multiple choice questions, Yes for Yes/No questions. Mapping that init_qlnode() function to the question list takes care of the entire initialization:

ll_map((llnode *)qlhead, init_qlnode, 0);

Now we have a complete question list ready to iterate. In one embodiment, at this phase, the number of iterations is calculated. Since the problem can easily grow exponentially, intolerable numbers of possibilities are not allowed at this phase. ql_stat() is a function which performs this calculation. When this function is mapped to the question list as in the following example:
   unsigned long iteration;
   iteration=1L;
   ll_map((llnode *) qlhead, ql_stat, &iteration);
Long variable "iteration" returns the number of probabilities:

```
Voidql_stat(pnode, datap)
qlnode *pnode;
unsigned long*datap:
{
        (*datap) = (long)(*datap) * (long)(ql_getnch(pnode));
{
```

In some extreme cases, it was observed that even that long integer overflowed, so that possibility should be kept in mind. In various experiments, we felt like having more than 2000 iterations results in excessively long calculations. Thus, in one embodiment if the number of the iterations is more than 2000 (or any other desired threshold number), the user is warned with a message and the algorithm is terminated at this state, giving the user the opportunity to select a smaller Paragraph for analysis.

In an alternative embodiment, the number of iterations is limited to a preselected number by stopping the generation of permutation when a preselected number of unique qlist state tree-state pairs or storage in the Master State Table. In this event, an indication is given to the user that not all textual permutations will be presented.

Finally, we fire the permutations machine. This is a simple iteration on the question list previously built and initialized. This algorithm was previously described in the Design section of this specification. The permutation machine works on a provided bitstring, the global block_root, and the state_table.

```
        bstring *bs;
        bs = bs_alloc( );
        bs = ql_iterate(qlhead, bs);
        bs_free(bs);
```

When this iteration is done, we have a state table including different qlist state and tree state pairs. The length of the table is the number of the possible different representations of the given Paragraph. Then stt_draft() is called with a state table and question list parameters as:
   stt_draft(state_table, qlhead);
This function maps a drafting routine on all the elements of the state table.

3.4. Uses of Permutations

In one embodiment of this invention, a Template window appears on a video screen and the user finds a Paragraph utilizing any convenient interface technique, including the presence of a special function key when the cursor is positioned at the desired beginning of a Paragraph, and again when a cursor is positioned at the desired end of a Paragraph. In the event the Paragraph is not "complete", in other words when it includes incomplete blocks, the method of this invention enlarges the Paragraph to provide a properly defined complete Paragraph. If desired, the user is then given a choice to again attempt to modify this Paragraph, for example in the event it became unduly large. Following such redefinition of the Paragraph, the method again ensures that the defined Paragraph is "complete".

The user then indicates that the permutations algorithm is to begin, for example by pressing a special function key designated for this purpose. If desired, a portion of the screen indicates the permutation number being displayed, and the total number of permutations. For example, the first permutation is indicated as "1 of NNN", where "NNN" is the total number of permutations for the given Paragraph. If desired, the user can quit the permutations algorithm by pressing a predefined key, such as the escape key. Other keys are defined in order to allow the user to move to the next permutation, or revert to the previous permutation, if desired.

4. CERTAIN ALTERNATIVE EMBODIMENTS

4.1. The Present Embodiment

In the embodiment, a user specifies a section of text, as described above in order to define a "complete Paragraph". Once the complete Paragraph has been defined, all possible permutations of the text are generated sequentially and made available to the user.

To illustrate, given a block tree:

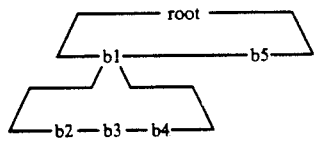

the following 18 text variations are produced:

| | | | | | |
|---|---|---|---|---|---|
| 1. | B1 | B2 | Not B3 | B4 | B5 |
| 2. | B1 | Not B2 | Not B3 | B4 | B5 |
| 3. | B1 | B2 | B3 | B4 | B5 |
| 4. | B1 | Not B2 | B3 | B4 | B5 |
| 5. | B1 | B2 | Not B3 | Not B4 | B5 |
| 6. | B1 | Not B2 | Not B3 | Not B4 | B5 |
| 7. | B1 | B2 | B3 | Not B4 | B5 |
| 8. | B1 | Not B2 | B3 | Not B4 | B5 |
| 9. | B1 | B2 | Not B3 | B4 | Not B5 |
| 10. | B1 | Not B2 | Not B3 | B4 | Not B5 |
| 11. | B1 | B2 | B3 | B4 | Not B5 |
| 12. | B1 | Not B2 | B3 | B4 | Not B5 |
| 13. | B1 | B2 | Not B3 | Not B4 | Not B5 |
| 14. | B1 | Not B2 | Not B3 | Not B4 | Not B5 |
| 15. | B1 | B2 | B3 | Not B4 | Not B5 |
| 16. | B1 | Not B2 | B3 | Not B4 | Not B5 |
| 17. | Not B1 | — | — | — | B5 |
| 18. | Not B1 | — | — | — | Not B5 |

Note that "—" specifies an impossible alternative.

4.2. Selection of "Relevent" Variations

In an alternative embodiment, the user specifies a portion of text as has been discussed in the previous embodiment. A complete Paragraph is assured, also as described above. However, in this embodiment, to further reduce the number of permutations that must be calculated and shown to the user, the question state table is reduced so that variations from unrelated questions are shown simultaneously.

To illustrate, given the following exemplary block tree in which the questions involved in blocks b1 and b5 are unrelated.

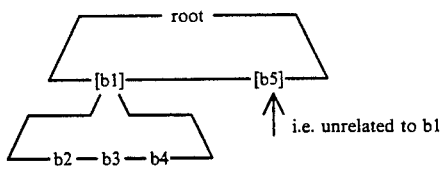

i.e. unrelated to b1

Assuming that the questions involved in b1 through b5 are all unrelated, the following three text variations are produced:

| 1. | Not B1 | N/A    | —      | —      | Not B5 |
|----|--------|--------|--------|--------|--------|
| 2. | B1     | Not B2 | Not B3 | Not B4 | B5     |
| 3. | B1     | B2     | B3     | B4     | B5     |

If however, questions are related, the results differ. For example, if block B4 is dependent upon the questions controling B3, an additional variation is presented:

| 4. | B1 | B2 | B3 | — | B5 |
|----|----|----|----|----|-----|

4.3.3. User Selected Questions

In another alternative embodiment, the user does not specify a Paragraph, but rather selects particular questions. The user is then presented with all variations in text resulting from these questions regardless of where such variations appear in the document.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

We claim:

1. A computer implemented method of automatically preparing a document of text, comprising the steps of:
    establishing a database of text, said database being capable of being expressed as a block structure;
    storing a binary representation of said database of text in a computer memory;
    generating and storing in the computer a plurality of permutations of text including the steps of:
        obtaining block nodes expressing decision points on said block structure;
        creating a block tree which expresses relationships between subblocks of said text and from which is derived a block state expression, said block state expression capable of defining the text of any permutation;
        obtaining a list of questions which includes all of the questions necessary to resolve said block nodes, and from said list of questions creating a question state table which expresses possible combinations of variations of said questions;
        iterating through said question state table to create a block state associated with each of said question states, and
        creating a master state table by storing, for each unique block state, a question state-block state pair; and displaying any desired permutation of at least a portion of text.

2. A method as in claim 1 wherein said step of creating said master state table stores, at most, a predefined threshold number of question state-block state pairs.

3. A method as in claim 1 wherein said step of obtaining said list of questions comprises the step of deriving said list of questions from the nodes of said block tree.

4. A method as in claim 1 wherein said steps of iterating and creating a master state table are performed simultaneously.

5. A method as in claim 1 which further comprises the step of possibly reducing the number of questions included in said question state table.

6. A method as in claim 5 wherein said step of possibly reducing comprises the step of defining a preselected portion of said text for analysis.

7. A method as in claim 6 wherein said step of possibly reducing comprises the step of determining from said preselected portion of text which questions are to be included in said question state table.

8. A method as in claim 7 wherein said step of determining comprises the step of user selection of questions to be included in said question state table.

9. A method as in claim 1 which further comprises the step of utilizing said master state table to calculate the number of possible permutations of text.

10. A method as in claim 1 which further comprises the step of utilizing said master state table to draft at least some of said permutations of text.

11. A method as in claim 1 which further comprises the step of utilizing said master state table to display a set of answers associated with a specific permutation of text.

12. A method as in claim 1 step of utilizing said master state table to display a permutation of text including an indication of the changes in text from a selected previous permutation of text.

13. A method as in claim 1 wherein said step of creating a question state table comprises the step of reducing the size of said question state table by varying unrelated questions simultaneously.

* * * * *